United States Patent
El-Sayed

(10) Patent No.: US 9,895,663 B2
(45) Date of Patent: Feb. 20, 2018

(54) INTEGRATED REVERSE OSMOSIS/PRESSURE RETARDED OSMOSIS SYSTEM

(71) Applicant: KUWAIT INSTITUTE OF SCIENTIFIC RESEARCH, Safat (KW)

(72) Inventor: Essam El-Din Farag El-Sayed, Ontario (CA)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 329 days.

(21) Appl. No.: 14/849,443

(22) Filed: Sep. 9, 2015

(65) Prior Publication Data

US 2017/0066670 A1    Mar. 9, 2017

(51) Int. Cl.
C02F 1/44 (2006.01)
C02F 9/00 (2006.01)
(Continued)

(52) U.S. Cl.
CPC .......... *B01D 61/10* (2013.01); *B01D 61/002* (2013.01); *B01D 61/022* (2013.01);
(Continued)

(58) Field of Classification Search
CPC .... B01D 61/002; B01D 61/025; B01D 61/58; B01D 61/022; B01D 61/04; B01D 61/06;
(Continued)

(56) References Cited

U.S. PATENT DOCUMENTS

| 2006/0144789 A1* | 7/2006 | Cath ............... B01D 61/002 210/641 |
| 2012/0037566 A1* | 2/2012 | Achilli ............. B01D 61/002 210/652 |
| 2014/0151283 A1* | 6/2014 | Sekine ................. B01D 61/06 210/259 |

FOREIGN PATENT DOCUMENTS

| KR | 10-2013-0127610 | 11/2013 |
| KR | 10-2014-0073312 | 6/2014 |

OTHER PUBLICATIONS

Sim et al. "StrategiC Co-Location in a Hybrid Process Involving Desalination and Pressure Retarded Osmosis (PRO)," Membranes, Sep. 2013; 3(3):98-125.

* cited by examiner

Primary Examiner — Pranav N Patel
(74) Attorney, Agent, or Firm — Richard C. Litman

(57) ABSTRACT

The integrated reverse osmosis/pressure retarded osmosis system includes a first housing configured for pretreating feed brine, a second housing, a third housing configured for pretreatment of seawater, a first splitter positioned in communicating relation with the third housing, a first pump positioned in communicating relation with the first splitter, a fourth housing positioned in communicating relation with the first pump, a mixer positioned in communicating relation with the second housing and the first splitter, a first energy recovery system positioned in communicating relation with the second housing, a second energy recovery system positioned in communicating relation with the fourth housing, and a generator. The fourth housing configured for receiving pressurized seawater and producing desalinated product water by reverse osmosis. The second housing configured to receive feed brine from an oil production waste stream and
(Continued)

decrease the salinity of the feed brine by pressure retarded osmosis.

20 Claims, 4 Drawing Sheets

(51) Int. Cl.
*B01D 61/08* (2006.01)
*B01D 61/10* (2006.01)
*B01D 61/00* (2006.01)
*B01D 61/02* (2006.01)
*B01D 61/04* (2006.01)
*B01D 61/06* (2006.01)
*B01D 61/58* (2006.01)
*C02F 103/08* (2006.01)
*B01D 61/14* (2006.01)

(52) U.S. Cl.
CPC ........... *B01D 61/025* (2013.01); *B01D 61/04* (2013.01); *B01D 61/06* (2013.01); *B01D 61/08* (2013.01); *B01D 61/58* (2013.01); *C02F 1/441* (2013.01); *C02F 1/442* (2013.01); *C02F 1/445* (2013.01); *B01D 61/027* (2013.01); *B01D 61/145* (2013.01); *B01D 61/147* (2013.01); *B01D 2313/243* (2013.01); *B01D 2313/246* (2013.01); *C02F 2103/08* (2013.01); *C02F 2201/009* (2013.01); *C02F 2301/043* (2013.01); *C02F 2301/066* (2013.01); *C02F 2303/10* (2013.01); *Y02W 10/30* (2015.05)

(58) Field of Classification Search
CPC ........ B01D 61/08; B01D 61/10; B01D 61/12; B01D 2311/04; B01D 2311/08; B01D 2311/25; B01D 2311/2649; B01D 2311/14; B01D 2313/246; B01D 2317/02; B01D 2317/022; B01D 2317/025; B01D 2317/04; B01D 2317/08; C02F 1/44; C02F 1/441; C02F 1/445; C02F 2103/08; C02F 2303/10; C02F 2201/009; C02F 9/00
See application file for complete search history.

INTEGRATED REVERSE OSMOSIS/PRESSURE RETARDED OSMOSIS SYSTEM

BACKGROUND OF THE INVENTION

1. Field of the Invention

The present invention generally relates to desalination and potable water production and, more specifically, to an integrated reverse osmosis/pressure retarded osmosis system configured for treating and managing high salinity oilfield water.

2. Description of the Related Art

Typically, a by-product of oil production is water with a significantly high salinity content. Such water cannot normally be discharged into the ocean for fear that the high salinity content of the water may increase the salinity content of the ocean waters and adversely affect the aquatic environment. Further, due to the high salinity content, this water is too salty for either human consumption or agricultural use. Desalination, therefore, can be used to dispose such water safely into the environment and/or convert it into usable potable water.

Operation of conventional distillation and reverse osmosis plants to desalinate waters with extremely high salinity, such as salinities prevalent in oilfield waters, can be difficult. The configuration of the typical distillation and reverse osmosis plants currently in use limits how such systems can be used for desalting such high salinity waters.

Thus, an integrated reverse osmosis/pressure retarded osmosis system solving the aforementioned problems is desired.

SUMMARY OF THE INVENTION

An embodiment of an integrated reverse osmosis/pressure retarded osmosis can include a first housing configured for receiving and pretreating feed brine from an onshore or offshore oil rig, a second housing having a first semi-permeable membrane, a third housing configured for receiving and pretreating seawater, a first splitter positioned in communicating relation with the third housing, a fourth housing having a second semi-permeable membrane, a first pump positioned in communicating relation with the first splitter and the fourth housing, a mixer positioned in communicating relation with the second housing, the first splitter, and the fourth housing, a first energy recovery system positioned in communicating relation with the second housing, a generator positioned in communicating relation with the first energy recovery system and the first pump, and a second energy recovery system, such as a turbine or a pressure exchanger, the second energy recovery system being positioned in communicating relation with the fourth housing and the mixer, whereby the second housing is configured to receive feed brine from the first housing so as to decrease the salinity of the feed brine by pressure retarded osmosis, and to release a pressurized outlet stream. The fourth housing is configured for receiving pretreated pressurized seawater and producing desalinated product water by reverse osmosis and releasing a pressurized brine solution stream.

The system can further include a second splitter in communication with the first energy recovery system, a second pump positioned in communicating relation with the second splitter, and a fifth housing configured for nanofiltration of the second outlet stream received from the second pump. The second splitter can be configured for splitting the depressurized outlet stream received from the first energy recovery system into a first outlet stream and a second outlet stream. The first outlet steam can be discharged into the sea and the second outlet stream can be pressurized in the second pump and provided to the fifth housing. The nanofiltration permeate stream from the fifth housing can be provided to an oil rig, and the nanofiltration brine stream from the fifth housing can be discharged into the sea along with the first outlet stream.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
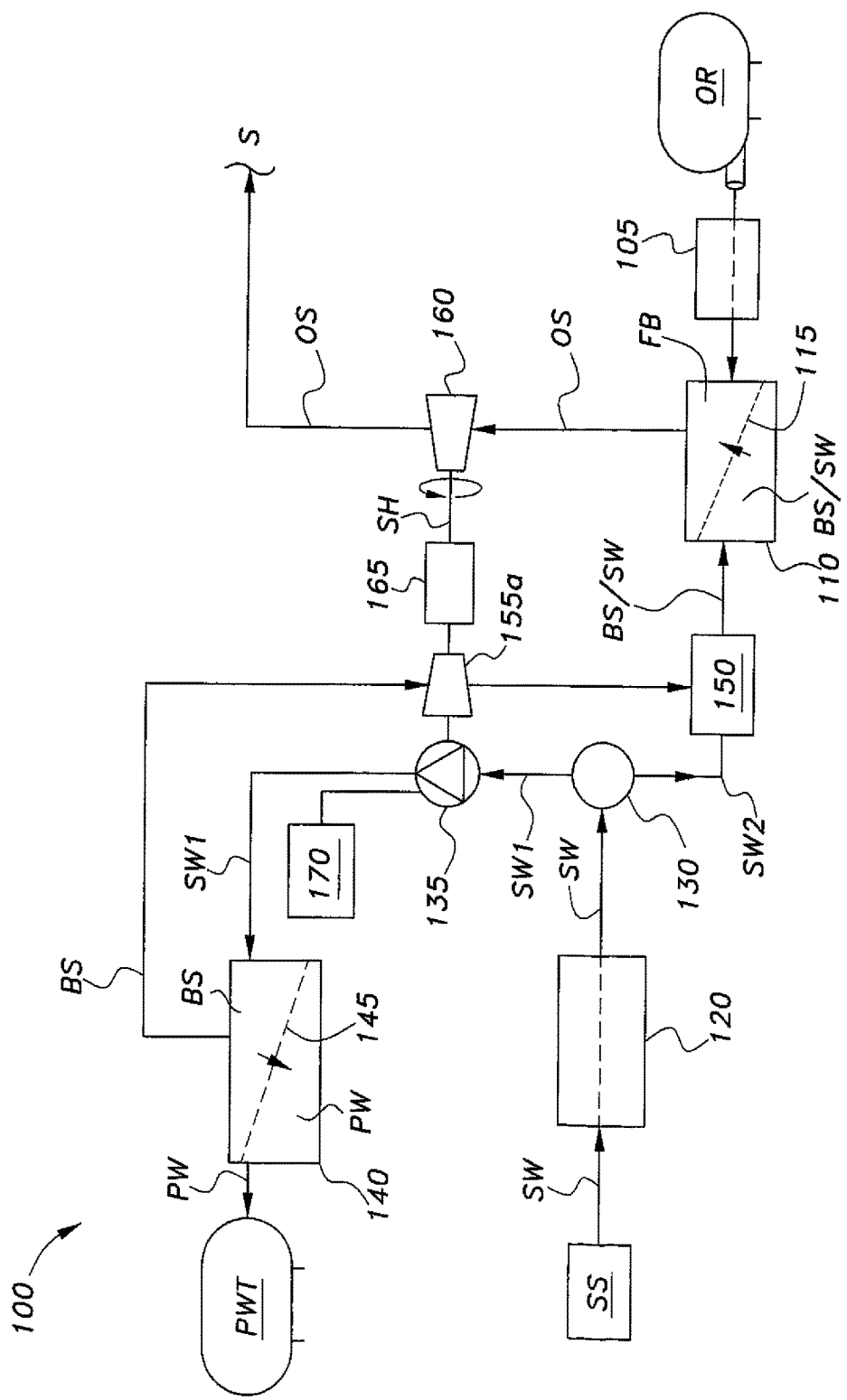
FIG. 1A is an environmental view of an embodiment of an integrated reverse osmosis/pressure retarded osmosis system having a second energy recovery system including a turbine, according to the present invention.
Figure 1B:
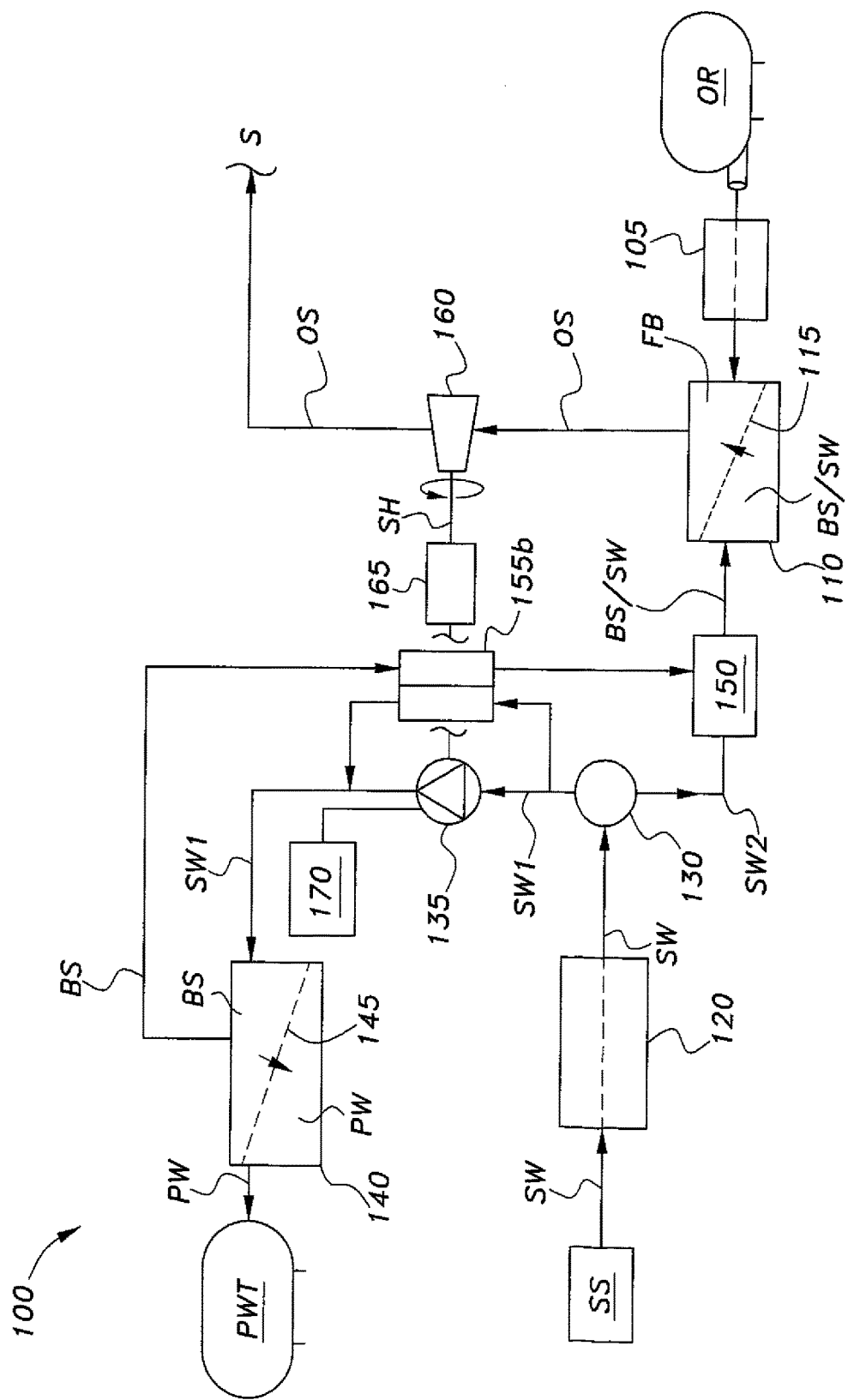
FIG. 1B is an environmental view of an embodiment of an integrated reverse osmosis/pressure retarded osmosis system having a second energy recovery system including a pressure exchanger, according to the present invention.

Referring to FIGS. 1A and 1B, an integrated reverse osmosis/pressure retarded osmosis system 100 is generally illustrated. The system 100 includes a first housing 105 configured for receiving and pretreating a feed brine FB, such as from an oil rig OR, a second housing 110 having a first semi-permeable membrane 115, a third housing 120 configured for receiving and pretreating seawater SW, a first splitter 130 positioned in communicating relation with the third housing 120, a fourth housing 140 having a second semi-permeable membrane 145, a first pump 135 positioned in communicating relation with the first splitter 130 and the fourth housing 140, a mixer 150 positioned in communicating relation with the second housing 110, the first splitter 130, and the fourth housing 140, a first energy recovery system 160 positioned in communicating relation with the second housing 110, a generator 165 positioned in communicating relation with the first energy recovery system 160 and the first pump 135, and a second energy recovery system, such as a turbine 155a (FIGS. 1A and 2A) or a pressure exchanger 155b (FIGS. 1B and 2B). The second energy recovery system 155a or 155b being positioned in communicating relation with the fourth housing 140 and the mixer 150.

The first housing 105 can be configured for receiving and pretreating the feed brine FB, such as the feed brine FB from the waste stream of an onshore or offshore oil rig OR or a plurality of oil rigs. The second housing 110, being positioned in communicating relation with the first housing 105, can be configured for receiving the pretreated feed brine FB from the first housing 105 and for discharging a pressurized outlet stream OS. The first semi-permeable membrane 115, positioned inside the second housing 110 can divide the second housing 110 into a first portion having high pressure and a high salinity liquid and a second portion having lower pressure lower salinity liquid than the first portion. The first semi-permeable membrane 115 can be a flat sheet, spiral wound, or hollow fiber.

The third housing 120 can be configured for receiving and pretreating seawater SW, e.g., by conventional coagulation/filtration, microfilatration, and/or ultrafiltration, and releasing the pretreated seawater to the first splitter 130. The first splitter 130 is configured for splitting the seawater SW received from the third housing 120 into a first portion of seawater SW1 and a second portion of seawater SW2. The first pump 135, such as a high pressure pump, can be configured for receiving and pressurizing the first portion of seawater SW1 from the first splitter 130, and directing the pressurized first portion of seawater SW1 into the fourth housing 140. The fourth housing 140 being configured to receive the pressurized seawater SW1 from the first pump 135 and purify the seawater by reverse osmosis so as to produce product water PW and a brine solution BS. The product water PW can be completely or substantially desalinated and discharged into a product water tank PWT, as illustrated in FIGS. 1A through 2B.

For reverse osmosis to occur, the pressurized first portion of seawater SW1 is pumped into the fourth housing 140 with sufficient pressure to overcome natural osmotic pressure present in the fourth housing 140. For example, when the pressurized first portion of seawater SW1 enters the fourth housing 140, the second semi-permeable membrane 145 can allow the solvent (i.e. water) to permeate and retains the solute (i.e. dissolved salts), thereby separating desalinated product water PW (e.g., potable water) from the brine solution BS. Additionally, the first portion of seawater SW1 that enters the fourth housing 140 does so with sufficient pressure so as to prevent product water PW from flowing back into the brine solution BS by osmosis. The depressurized product water PW can then be discharged into the product water tank PWT and the pressurized brine solution BS can be discharged into the second energy recovery system 155a or 155b. The second energy recovery system 155a or 155b, can be configured to depressurize the brine solution BS discharged from the fourth housing 140 and transfer the energy, in the form of pressure, to the first pump 135. It is to be noted that the second energy recovery system 155a or 155b can be positioned in communicating relation to the generator 165 so as to power the generator 165.

The mixer 150 can be configured for receiving and mixing the second portion of seawater SW2 discharged from the first splitter 130 and the depressurized brine solution BS discharged from the second energy recovery system 155a or 155b so as to form a brine solution-seawater combination BS/SW. The brine solution-seawater combination BS/SW can be discharged into the second portion of the second housing 110. The feed brine FB can be discharged into the first portion of the second housing 110. A hydrostatic pressure can be generated in the first portion of the second housing 110 by pressure-retarded osmosis so as to pressurize the outlet stream OS as described in detail below.

The brine solution-seawater combination BS/SW in the second portion of the second housing 110 can have a second salinity and the feed brine FB in the first portion of the second housing 110 can have a first salinity that is significantly greater than the second salinity. The first semi-permeable membrane 115 can allow the solvent (i.e. water) to permeate and retains the solute (i.e. dissolved salts). The chemical potential difference between the solutions causes transport of water from the diluted salt solution, i.e., from the brine solution-seawater combination BS/SW, to the more concentrated salt solution, i.e., feed brine FB stream. Because of hydrostatic pressure applied to the concentrated solution, the water transport will be partly retarded. The transport of water from the low-pressure diluted solution to the high-pressure concentrated solution results in a pressurization of the volume of transported water. This pressurized volume of transported water or outlet stream OS can exit the second housing 110 and be used to generate electrical power by the first energy recovery system 160, e.g., a hydraulic turbine, and the generator 165.

The first housing 105 can be formed from any type of material suitable to receive the feed brine FB, such as the feed brine FB from the waste stream of one or more onshore or offshore oil rigs OR. The first housing 105 can be configured for pretreating the feed brine FB, such as through striping hydrogen sulfide and/or ammonia, removing dispersed and/or nondispersed oils, and suspended solids and any other environmentally harmful substances. The second housing 110 can be formed from any type of material suitable for receiving the feed brine FB at a pressure higher than the osmotic pressure of the feed brine FB. The third housing 120 can be formed from any type of material suitable for receiving the seawater SW from a seawater source SS, such as the sea S, ocean, or gulf. The third housing 120 can be configured for pretreating the seawater SW, such as through conventional coagulation/filtration, microfilatration and/or ultrafiltration pretreatment. The fourth housing 140 can be formed from any type of material suitable for receiving seawater SW at a pressure higher, such as significantly higher, than the operating pressure of seawater reverse osmosis plants. The first and second semi-permeable membranes 115, 145, respectively can be any type of semi-permeable membrane, e.g., flat sheet, spiral wound, or hollow fiber, that can allow the solvent (i.e. water) to permeate and retain the solute (i.e. dissolved salts).

The first splitter 130 can be any type of suitable housing configured for receiving the seawater SW from the third housing 120, dividing the seawater SW received from the third housing 120 into two portions, e.g. the first portion of seawater SW1 and the second portion of seawater SW2, and discharging a first portion of seawater SW1 into the first pump 135 and the second portion of seawater SW2 into the mixer 150. The first pump 135 can be any suitable pump, e.g., a high pressure pump, that can receive and pressurize the first portion of seawater SW1 from the first splitter 130 and pump the first portion of the seawater SW1 into the fourth housing 140. The fourth housing 140 can be formed from any type of material suitable for receiving the pressurized first portion of seawater SW1 from the first pump 135. The fourth housing 140 can be configured for discharging the product water PW into the product water tank PWT and for discharging the brine solution BS into the second energy recovery system 155a or 155b.

The mixer 150, positioned in communicating relation with the second housing 110, and can be any type of mixer that can allow the mixture of the second portion of seawater SW2 discharged from the first splitter 130 and the depressurized brine solution 13S discharged from the second energy recovery source 155a or 155b to form the brine solution-seawater combination BS/SW.

The first energy recovery system 160 can be any type of suitable energy recovery system, such as a hydraulic turbine, capable of generating sufficient energy to power the generator 165, which, in turn, can operate the first pump 135.

The second energy recovery system 155a or 155b can be a turbine, such as a Pelton wheel, a pressure exchanger, or any recovery system capable of depressurizing the brine solution BS discharged from the fourth housing 140 and recovering the energy, in the form of pressure, so as to reduce a power requirement by the first pump 135. Further, the system 100 can also include an external power source 170, such as a plurality of solar panels and/or a wind turbine, so as to provide the first pump 135 with any additional power needed to inject the first portion of seawater SW1 into the fourth housing 140.

Figure 2A:
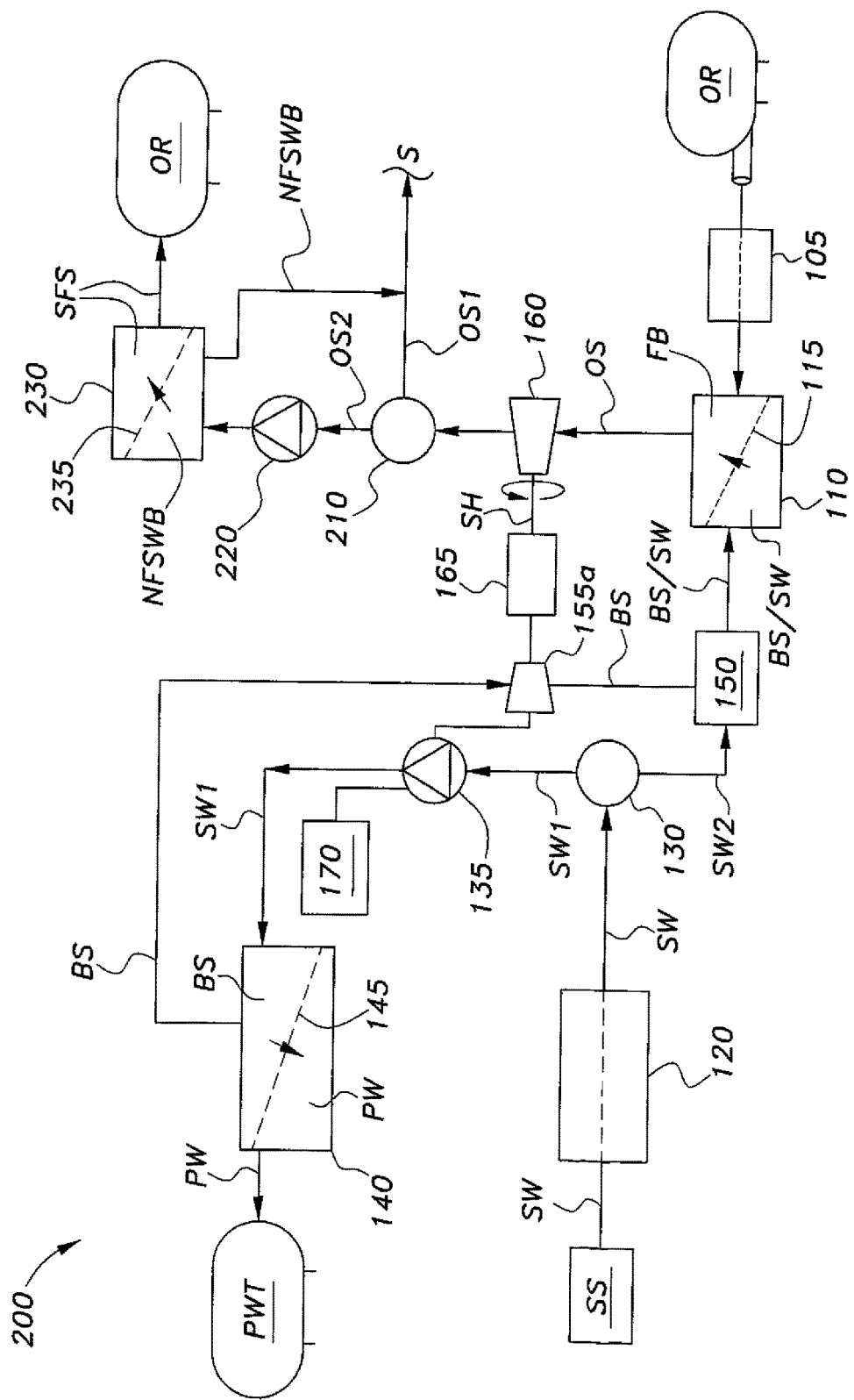
FIG. 2A is an environmental view of another embodiment of an integrated reverse osmosis/pressure retarded osmosis system having a second energy recovery system including a turbine, according to the present invention.
Figure 2B:
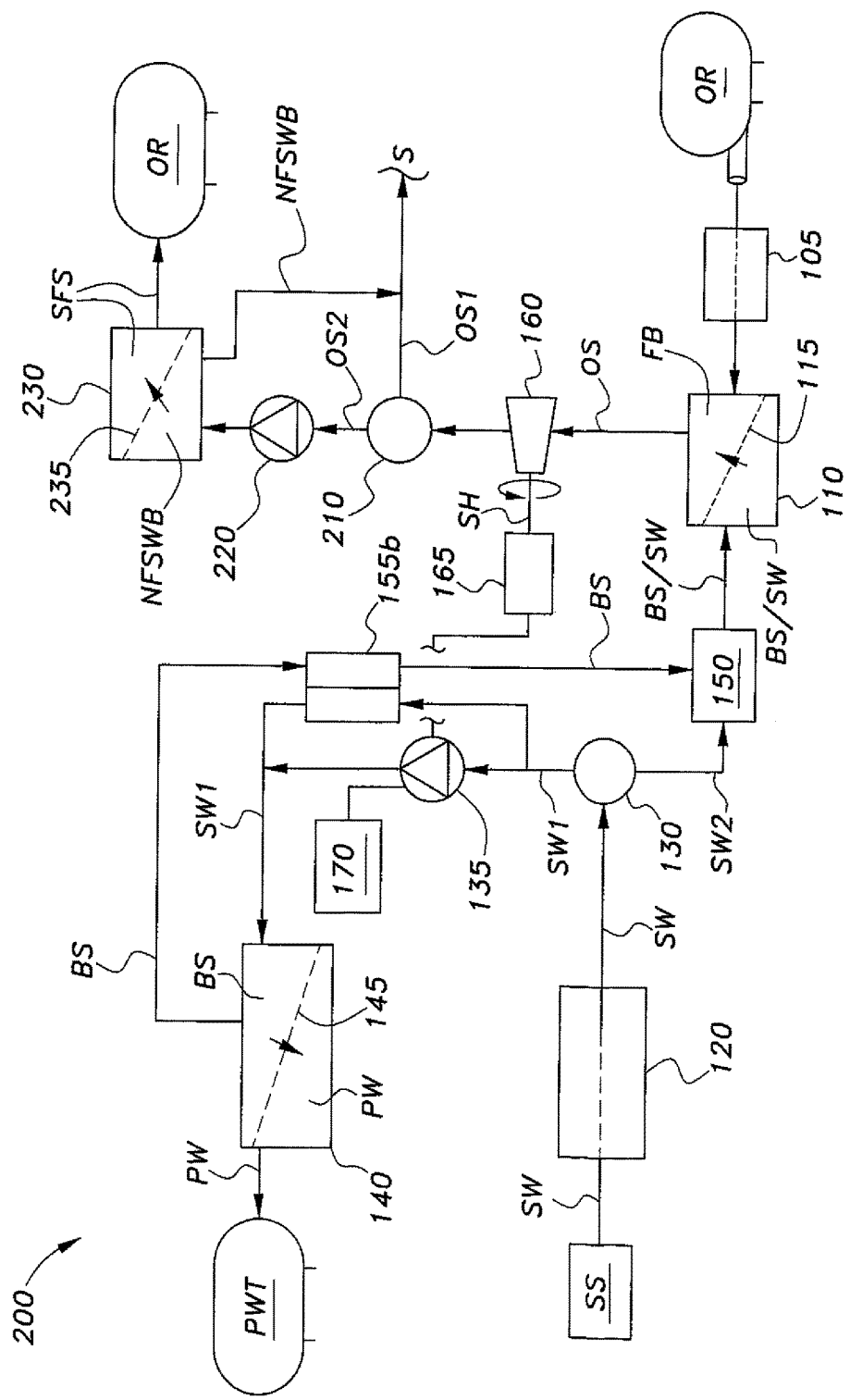
FIG. 2B is an environmental view of another embodiment of an integrated reverse osmosis/pressure retarded osmosis system having a second energy recovery system including a pressure exchanger, according to the present invention.

Referring to FIGS. 2A and 2B, another embodiment of an integrated reverse osmosis/pressure retarded osmosis system 200 is generally illustrated. The system 200 can be designed to reinject a sulfate-free stream SFS, or a substantially sulfate-free stream SFS, into an onshore or offshore oil rig OR to aid in the production of oil. The system 200 is substantially similar to the system 100, described above. The difference between the system 100, described above, and the system 200 is that the system 200 can include a second splitter 210, a fifth housing 230 having a third semi-permeable membrane or nanofiltration membrane 235 and a second pump 220, such as a low pressure pump, being positioned in communicating relation with the fifth housing 230.

The second splitter 210 can be configured for receiving the depressurized outlet stream OS from the first energy recovery system 160 and for splitting the depressurized outlet stream OS into a first portion outlet stream OS1 and a second portion outlet stream OS2. The second pump 220 can be configured for pumping the second portion outlet stream OS2 into the fifth housing 230. Once in the fifth housing 230, the second portion outlet stream OS2 can flow through the third semi-permeable membrane 235 and undergo seawater nanofiltration so as to eliminate or substantially eliminate sulfate from the second portion outlet stream OS2 and generate a nano-filtrate seawater brine NFSWB and the sulfate-free stream SFS. It is to be noted that the generator 165 can be configured to power the second pump 220.

By way of operation, by entering the first housing 105, the feed brine FB can be pretreated so as to meet regulatory standards, such as the standards set forth by the Environmental Protection Agency concerning removal of hydrogen sulfide ($H_2S$), oil, etc. from water. As such, oil, hydrogen sulfide, as well as other substances and/or chemicals can be removed from the feed brine FB prior to entering into the second housing 110. The feed brine FB injected into the second housing 110 can have a high concentration of salt, such as a salt concentration ratio (as mass fraction) of 0.25 and can flow into the second housing 110 at any suitable flow rate, such as a mass flow rate of about 1 ton per hour. Further, it is to be noted that this process can take place at any suitable temperature, such as room temperature.

Seawater SW can be drawn from the seawater source SS and into the third housing 120 where the seawater can undergo pretreatment, such as conventional coagulation/filtration, microfiltration and/or ultrafiltration pretreatment, so as to remove any unwanted substances, such as suspended soils and bacteria, from the seawater SW to meet the required feed water quality for normal operation of reverse osmosis plants. The seawater SW being injected into the third housing 120 can have any suitable concentration of salt, such as a salt concentration ratio (as mass fraction) of about 0.04, and can flow into the third housing 120 at any suitable flow rate, such as a mass flow rate of about seven tons per hour.

Once the seawater SW has undergone pretreatment in the third housing 120, the seawater SW can be injected into the first splitter 130. The first splitter 130 can then split the seawater SW into the first portion of seawater SW1 and the second portion of seawater SW2. The first portion of seawater SW1 can, subsequently, be injected into the first pump 135, e.g. at a mass flow rate of about two tons per hour. The first pump 135 can pressurize the first portion of the seawater SW1 that is pumped into the fourth housing 140. The second portion of seawater SW2, on the other hand, can be discharged into the mixer 150, e.g., at a mass flow rate of about five tons per hour.

It is contemplated that the first pump 135 can provide sufficient pressure, e.g., about 68 to 70 bar, to overcome the natural osmotic pressure present in the fourth housing 140 so that seawater reverse osmosis effect can occur. As described previously, when the first portion of seawater SW1 enters the fourth housing 140, the semi-permeable membrane 145, such as a semi-permeable reverse osmosis membrane, can allow the solvent (i.e. water) to permeate and retains the solute (i.e. dissolved salts), thereby separating the product water PW from brine solution BS. Additionally, the first portion of seawater SW1 that enters the fourth housing 140 does so with sufficient pressure so as to prevent the product water PW from flowing back into the brine solution BS by osmosis. The product water PW produced can be subsequently discharged into the product water tank PWT. The product water PW can have a salt concentration of zero, or near zero, and can flow into the product water tank PWT at any suitable flow rate, such as a flow rate of one ton per hour. It is to be noted, that the present process can be done at any suitable temperature, such as room temperature. Further, the present process can be an isothermal process.

The brine solution BS can then be discharged into the second energy recovery system 155a (FIGS. 1A and 2A), 155b (FIGS. 1B and 2B), prior to being discharged into the mixer 150. The brine solution BS can have any suitable concentration of salt, such as a salt concentration (mass fraction) ratio of 0.08, and can flow into the second energy recovery system 155a or 155b and subsequently into the mixer 150 at any suitable flow rate, such as at a flow rate of one ton per hour. It is to be noted that as the brine solution BS flows into the second energy recovery system 155a,155b the brine solution BS can be depressurized and the energy can be transferred from the second energy recover system 155a or 155b can be transferred to the first pump 135.

The second portion of seawater SW2 that is injected into the mixer 150 can then mix with the brine solution BS discharged by the second energy recovery system 155a or 155b so as to form the brine solution-seawater combination BS/SW having a high concentration of salt. For example, the brine solution BS, having a salt concentration (mass fraction) ratio of about 0.08, received from the fourth housing 140 and subsequently from the second energy recovery system 155a or 155b can be mixed with the second portion of seawater SW2, having a salt concentration (mass fraction) ratio of about 0.04, received from the first splitter 130, so as to form the brine solution-seawater combination BS/SW having a salt concentration (mass fraction) ratio of about 0.047.

After the brine solution-seawater combination BS/SW has been generated in the mixer 150, the brine solution-seawater combination BS/SW can be injected into the second housing 110 at a suitable flow rate. For example, the flow rate of the brine solution-seawater combination BS/SW into the second housing can be six tons per hour.

Once the brine solution-seawater combination BS/SW and the feed brine FB are in the second housing 110, the pressurized outlet stream OS can be generated through pressure retarded osmosis, as described above. The pressurized outlet stream OS flows through the first energy recovery system 160 to generate electricity, such as by rotating a shaft SH coupled to the first energy recovery system 160 so as to power the generator 165 that, in turn, can power the first pump 135. After the pressurized outlet stream OS flows through the first energy recovery system 160 and is converted into a depressurized outlet stream, the depressurized outlet stream OS, having an acceptable salinity concentration, can be discharged into the sea S at a suitable flow rate. For example, the outlet stream OS can have a salt concentration (mass fraction) ratio of about 0.076 and can have a flow rate of seven tons per hour.

In the system 200, however, illustrated in FIGS. 2A and 2B, the second splitter 210 can split the depressurized outlet stream OS received from the first energy recovery system 160 into the first portion outlet stream OS1 and the second portion outlet stream OS2. The first portion outlet stream OS1 can be discharged into the sea S in a similar fashion to system 100. The second portion outlet stream OS2, which is not discharged into the sea S, can, subsequently, be injected into the second pump 220, such as a low pressure pump, that can receive the second portion outlet stream OS2 from the second splitter 210, pressurize the second portion outlet stream OS2 from the second splitter 210, and pump the pressurized second portion outlet stream OS2 into the fifth housing 230. Once in the fifth housing 230, the second portion outlet stream OS2 can flow through the third semi-permeable membrane 235 and undergo seawater nanofiltration so as to eliminate or substantially eliminate, sulfate from the second portion outlet stream OS2, and generate a nanofiltration seawater brine NFSWB and a sulfate-free stream SFS. It is to be noted that a portion of the nanofiltration seawater brine NFSWB can be combined with the first portion outlet stream OS1 so as to be discharged into the sea S and a remainder of the nanofiltration seawater brine NFSWB can be filtered through the third semi-permeable membrane 235 so as to generate the sulfate free stream SFS that can be injected into the oil rig OR. The concentration of salt of the sulfate-free stream SFS can include any suitable concentration, such as a salt concentration ratio (as mass fraction) of about 0.068, and can flow into the oil rig OR at any suitable flow rate, such as at a flow rate of one ton per hour.

It is to be understood that the present invention is not limited to the embodiments described above, but encompasses any and all embodiments within the scope of the following claims.

I claim:

1. An integrated reverse osmosis/pressure retarded osmosis system, comprising:
    a first housing being configured for receiving and pretreating feed brine from an oil rig and generating a pretreated feed brine;
    a second housing having a first semi-permeable membrane, the second housing positioned in communicating relation with the first housing and configured for receiving the pretreated feed brine from the first housing and generating a pressurized outlet stream;
    a first energy recovery system positioned in communicating relation with the second housing, the first energy recovery system configured for receiving the pressurized outlet stream from the second housing and for discharging the pressurized outlet stream;
    a third housing configured for receiving and pretreating seawater and generating a pretreated seawater;
    a first splitter positioned in communicating relation with the third housing, the first splitter configured for splitting the pretreated seawater from the third housing into a first portion of the pretreated seawater and a second portion of the pretreated seawater;
    a first pump positioned in communicating relation with the first splitter, the first pump configured for receiving and pressurizing the first portion of the pretreated seawater discharged from the first splitter;
    a fourth housing having a second semi-permeable membrane, the fourth housing being positioned in communicating relation with the first pump and configured for receiving the pressurized first portion of seawater from the first pump and separating the first portion of the pretreated seawater into product water and brine solution;
    a second energy recovery system positioned in communicating relation with the fourth housing, the second energy recovery system configured for receiving the pressurized brine solution from the fourth housing, for discharging the brine solution, and for transferring a recovered energy to the first pump;
    a mixer positioned in communicating relation with the first splitter, the second energy recovery system, and the second housing, the mixer being configured for receiving the second portion of the pretreated seawater discharged from the first splitter and the brine solution discharged from the second energy recovery system and for forming a brine solution-seawater combination and discharging the brine solution-seawater combination into the second housing; and
    a generator positioned in communicating relation with the first energy recovery system and to the first pump.

2. The integrated reverse osmosis/pressure retarded osmosis system according to claim 1, further comprising:
    a fifth housing having a third semi-permeable membrane;
    a second splitter in communicating relation with the fifth housing and the first energy recovery system, the second splitter being configured for receiving an outlet stream from the first energy recovery system and splitting the outlet stream into a first portion outlet stream and a second portion outlet stream; and
    a second pump in communicating relation with the second splitter and the fifth housing;
    whereby the second pump receives the second portion outlet stream and pumps the second portion outlet stream into the fifth housing.

3. The integrated reverse osmosis/pressure retarded osmosis system according to claim 1, wherein the first energy recovery system comprises a turbine.

4. The integrated reverse osmosis/pressure retarded osmosis system according to claim 3, wherein the second energy recovery system is positioned in communicating relation with the generator.

5. The integrated reverse osmosis/pressure retarded osmosis system according to claim 1, wherein the second energy recovery system is selected from a group consisting of a turbine and a pressure exchanger.

6. The integrated reverse osmosis/pressure retarded osmosis system according to claim 1, further comprising an external power source.

7. The integrated reverse osmosis/pressure retarded osmosis system according to claim 6, wherein the external power source is selected from the group consisting of a plurality of solar panels and a wind turbine.

8. The integrated reverse osmosis/pressure retarded osmosis system according to claim 1, wherein the second energy recovery system includes a pressure exchanger, the pressure exchanger being positioned in communicating relation with the first splitter, the fourth housing, and the mixer.

9. The integrated reverse osmosis/pressure retarded osmosis system according to claim 1, wherein the second energy recovery system includes a turbine, the turbine being positioned in communicating relation with the generator.

10. A method for desalinating seawater and decreasing the salinity of a by-product of oil production, comprising the steps of:
providing a first housing configured for pretreating feed brine and generating a pretreated feed brine, the feed brine being a by-product of oil production;
providing a second housing including a semi-permeable membrane, the semi-permeable membrane dividing the second housing into a first portion having a liquid with higher salinity and higher pressure and a second portion having a liquid with less salinity and lower pressure than the liquid in the first portion;
releasing the pretreated brine feed into the second housing;
providing seawater to a third housing for pretreatment to form pretreated seawater;
releasing the pretreated seawater into a first splitter;
dividing the pretreated seawater in the first splitter into a first pretreated seawater portion and a second pretreated seawater portion;
pressurizing the first pretreated seawater portion to form a pressurized first pretreated seawater portion;
pumping the pressurized first pretreated seawater portion into a fourth housing, the fourth housing including a second semi-permeable membrane;
producing a product water and a brine solution in the fourth housing by reverse osmosis;
mixing the brine solution with the second pretreated seawater portion to form a seawater-brine solution;
releasing the seawater-brine solution into the second portion of the second housing;
providing the pretreated feed brine to the first portion of the second housing;
passing solvent from the seawater-brine solution through the first semi-permeable membrane in the second housing to the feed brine in the second housing by pressure retarded osmosis to form a pressurized outlet stream; and
releasing the pressurized outlet stream from the second housing.

11. The method for desalinating seawater and decreasing the salinity of a by-product of oil production according to claim 10, wherein the seawater provided to the third housing has a salt concentration ratio at mass fraction of about 0.04 and the product water formed in the fourth housing has a salt concentration ratio at mass fraction of about 0.

12. The method for desalinating seawater and decreasing the salinity of a by-product of oil production according to claim 10, wherein the feed brine provided to the first housing has a salt concentration ratio at a mass fraction of about 0.25 and the outlet stream released from the second housing has a salt concentration ratio at mass fraction of about 0.047.

13. The method for desalinating seawater and decreasing the salinity of a by-product of oil production according to claim 10, wherein the outlet stream from the second housing is released to the sea.

14. The method for desalinating seawater and decreasing the salinity of a by-product of oil production according to claim 10, further comprising the steps of:
generating energy by discharging the pressurized outlet stream from the second housing into a first energy recovery system;
powering the first pump using the energy recovered by the first energy recovery system; and
releasing the outlet stream from the first energy recovery system.

15. The method for desalinating seawater and decreasing the salinity of a by-product of oil production according to claim 14, wherein the first energy recovery system comprises a turbine.

16. The method for desalinating seawater and decreasing the salinity of a by-product of oil production according to claim 14, wherein the outlet stream from the first energy recovery system is released to the sea.

17. The method for desalinating seawater and decreasing the salinity of a by-product of oil production according to claim 10, further comprising the steps of:
recovering energy by discharging a pressurized brine solution from the fourth housing into a second energy recovery system;
releasing the brine solution from the second energy recovery system into a mixer; and
powering the first pump with energy recovered by the second energy recovery system.

18. The method for desalinating seawater and decreasing the salinity of a by-product of oil production according to claim 17, wherein the second energy system is selected from a group consisting of a turbine and a pressure exchanger.

19. The method for desalinating seawater and decreasing the salinity of a by-product of oil production according to claim 10, further comprising the steps of:
generating an outlet stream from the second housing;
providing a second splitter positioned in communicating relation with the first energy recovery system, the second splitter configured to split the outlet stream into a first portion outlet stream and a second portion outlet stream;
releasing the first portion outlet stream into the sea;
generating a pressurized outlet stream;
pumping the pressurized outlet stream into a fifth housing having a third semi-permeable membrane to form a sulfate free stream and a nanofiltration seawater brine solution; and
releasing the sulfate free stream and the nanofiltration seawater brine solution.

20. The method for desalinating seawater and decreasing the salinity of a by-product of oil production according to claim 19, wherein the sulfate free stream is released into an oil rig and the nanofiltration seawater brine solution is released into the sea.

* * * * *